United States Patent

Lawrence

[15] 3,700,124
[45] Oct. 24, 1972

[54] TRAILER LOADING AND UNLOADING EQUIPMENT

[72] Inventor: Richard A. Lawrence, 2737 Siverhill Drive, Pontiac, Mich. 48055

[22] Filed: June 29, 1971

[21] Appl. No.: 158,023

[52] U.S. Cl. ................................214/85, 296/58
[51] Int. Cl. ..........................................B65f 67/02
[58] Field of Search..........................214/85, 85.1; 296/57–61

[56] References Cited

UNITED STATES PATENTS

| 2,370,427 | 2/1945 | Sherry | 214/85 |
| 1,699,882 | 1/1929 | Ferguson | 214/85 |
| 3,511,393 | 5/1970 | Abromavage et al | 214/85 |

*Primary Examiner*—Albert J. Makay
*Attorney*—William T. Sevald

[57] ABSTRACT

A trailer for hauling wheeled loads too heavy for manual lifting for the average person having a ramp-platform positionable at the rear end of the trailer floor and removable therefrom and insertable below the trailer floor on slide flanges for travel where it is secured for travel. The tail-gate is hinged at the bottom and upon opening swings down into contact with the ground surface and acts as a support leg at the rear end of the trailer to prevent tipping when loading and unloading. A pivotally mounted cross-rod at the rear of the floor below the slide flanges has radial lifting and lowering arms for receiving the front end of the ramp at the rear end of the floor when the operator slides the ramp out from below the floor. A lever on the rod enables the user to pivot the rod and lift-lower arms to raise and hold the front end of the ramp at the rear end of the floor. To again stow the ramp for travel, the user reversely pivots the rod with the hand lever to lower the front end of the ramp and then slides the ramp on the flanges below the floor.

3 Claims, 8 Drawing Figures

PATENTED OCT 24 1972 3,700,124

INVENTOR.
Richard A. Lawrence
BY
William P. Sewald
ATTORNEY

PATENTED OCT 24 1972 3,700,124

INVENTOR.
Richard A. Lawrence
BY
ATTORNEY

INVENTOR.
Richard A. Lawrence

TRAILER LOADING AND UNLOADING EQUIPMENT

This invention relates to vehicle trailers having a ramp for wheeled-on loads, means for mounting, dismounting, and storing the ramp for travel, and means for supporting the rear end of the trailer during loading and unloading to prevent tipping.

An object of the invention is to provide a trailer with a platform insertable below the floor of the trailer for travel and removable therefrom to use as a ramp in loading and unloading the trailer.

An object of the invention is to provide easily operable means to rockably secure the front end of the platform at the rear end of the floor as a ramp with the rear end of the platform resting on the ground.

An object of the invention is to provide a tail-gate transversely hingedly mounted at the rear end of the floor so that when it swings down it contacts the supporting surface and acts as a support leg at the rear end of the trailer against dropping or pivoting during loading and unloading.

An object of the invention is to provide means for receiving, raising, and lowering the front end of the platform relative to the rear end of the floor between the storage level and the use level of the platform.

An object of the invention is to provide a hand lever operated pivotal rod having lifting and lowering radial arms for positioning and securing the front end of the platform at floor level for use and at slide channel level for storage and for raising and lowering the front end of the platform between said positions.

These and other objects of the invention will become apparent by reference to the following description of a trailer embodying the invention taken in connection with the accompanying drawings showing a preferred exemplary device, in which.

Figure 1:
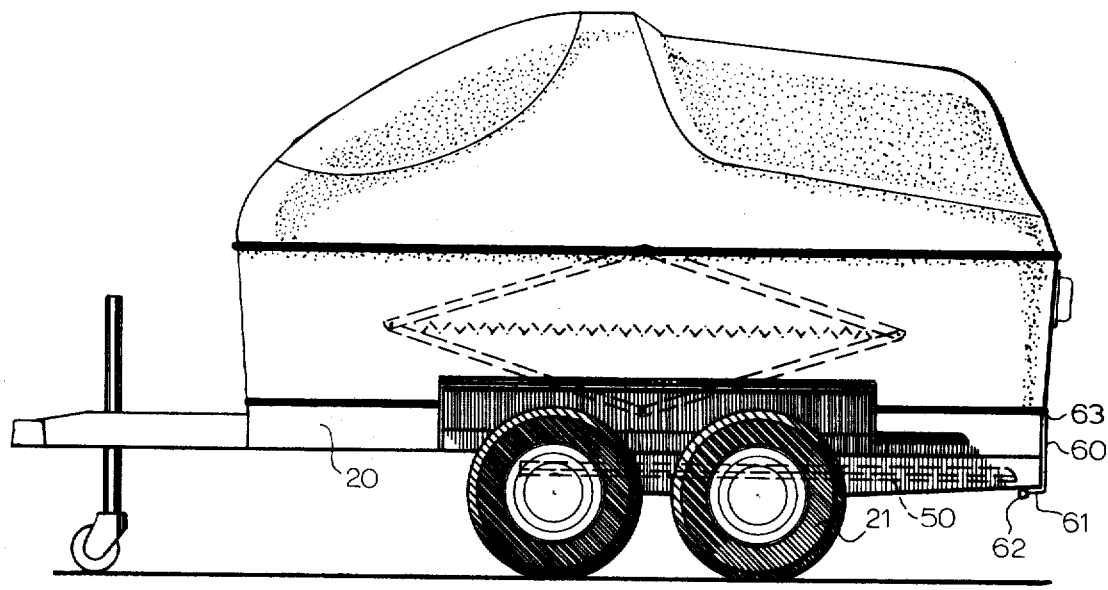
FIG. 1 is a side elevational view of a trailer embodying the invention with the platform shown in broken lines in the travel position.
Figure 2:
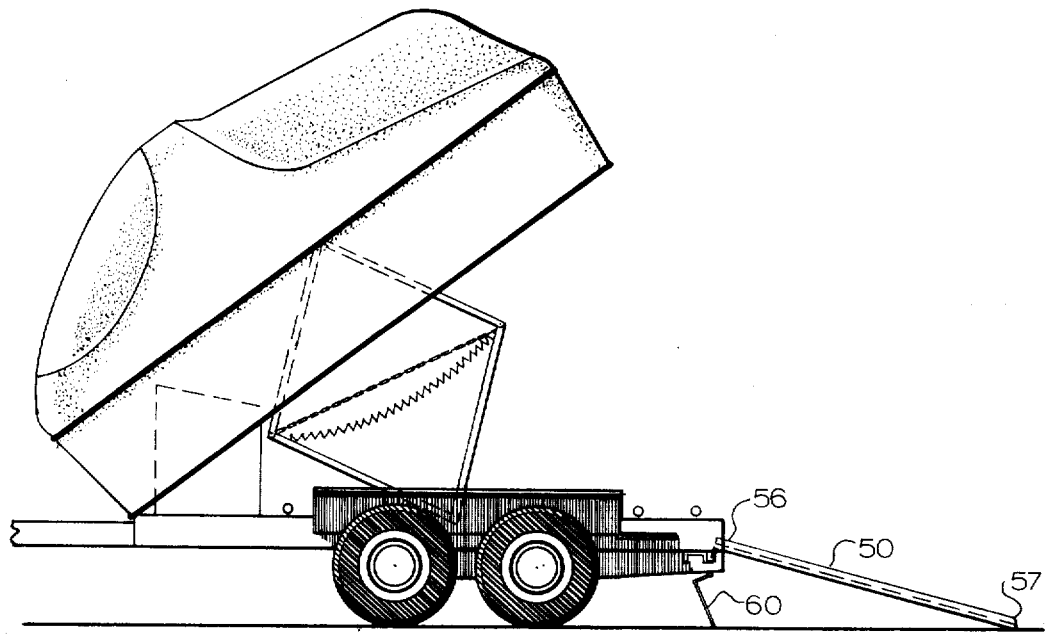
FIG. 2 is a side elevational view of the trailer of FIG. 1 shown in the use position with the top cover in the open position, the tail-gate in ground support contact, and the platform in position as a ramp leading from the ground to the level of the trailer floor.
Figure 3:
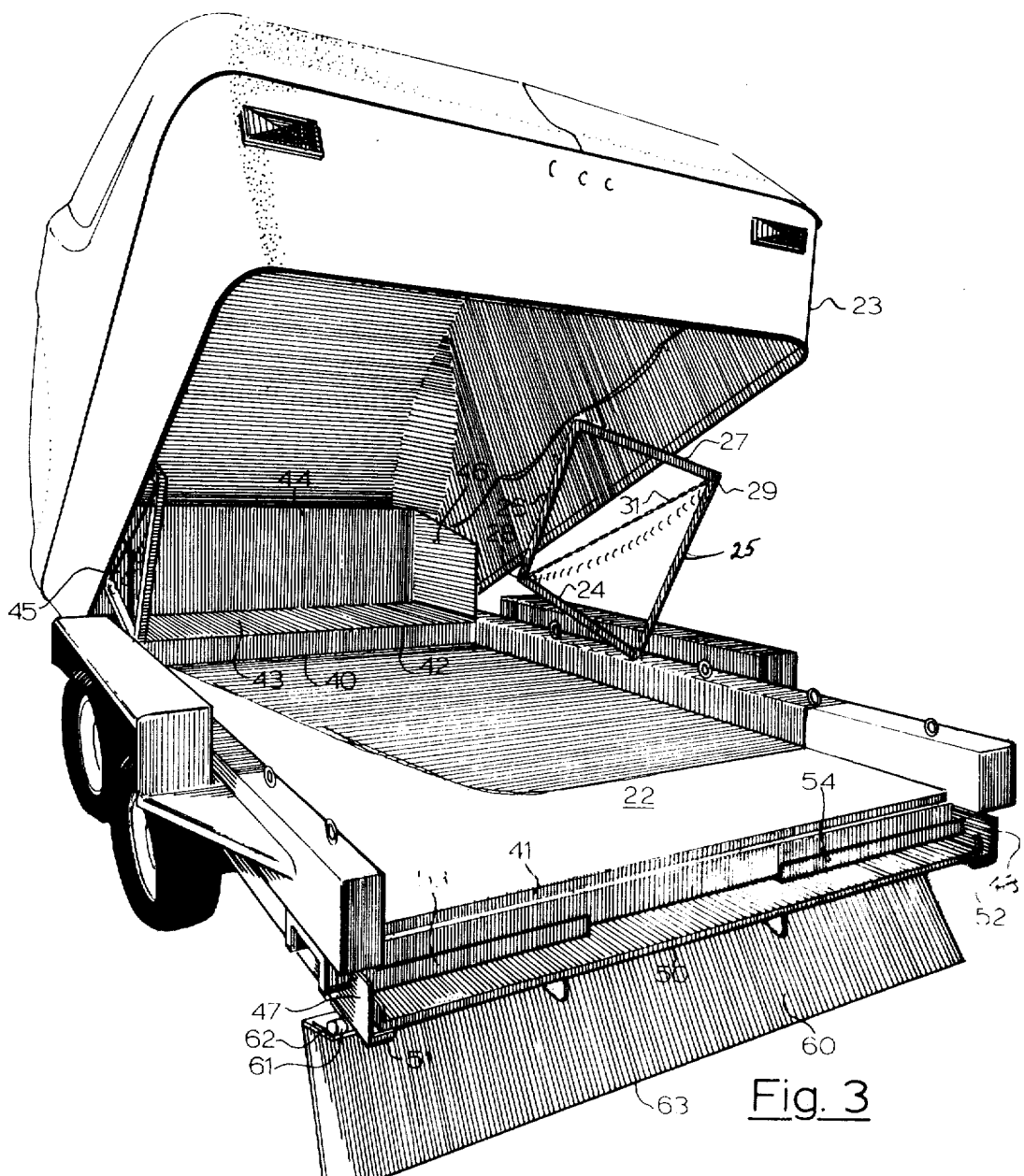
FIG. 3 is an enlarged rear perspective view of the trailer with the top cover up, the tail-gate down, and the platform stored below the floor for travel.

Referring now to the drawings wherein like reference numerals refer to like and corresponding parts throughout the several views, the trailer shown therein to illustrate the invention comprises a body 20, paired wheels 21, a floor 22, and a hinged top 23. The top 23 is pivotally mounted on the front of the body 20 and is swingable between the closed position of FIG. 1 and the open position of FIGS. 2 and 3. Paired opposed toggle levers links 24 and 25 are pivoted on the body 20 and paired opposed toggle lever links 26 and 27 are pivoted on the top 23 on both sides of the body 20. The links 24 and 26 and the links 25 and 27 are pivotally connected at their outer ends at 28 and 29 resiliently urging the links together to the open position of the top 23 as seen in FIGS. 2 and 3. A safety chain 31 may be hooked between the points 28 and 29 to hold the open position by preventing spreading of these points. When the top 23 is brought down by the user, the points 28 and 29 gradually spread and thus gradually stretch the spring 31 to compensate for the weight of the top 23. Thus the top is easily closed and is easily opened with the stretched spring 31 exerting closing force on the spread points 28 and 29. Any other means for compensating for the weight of the top 23 in opening and closing may be used.

The floor 22 has a front end 40 and a rear end 41. A vertical cross-panel 42 rises at the front end 40 of the floor and constitutes an abutment for limiting forward movement of wheeled loads. A horizontal cross-panel 43 leads forwardly from the top of the vertical cross-panel 42 and constitutes a shelf for miscellaneous loads. An upstanding front wall 44 and side walls 45 and 46 extend upwardly from the front edge and side edge of the panel 43 to retain things on the shelf expecially under sudden stop conditions.

Paired channel members 47 and 48 having flanges 51 and 52 lie under the floor 22. A platform 50 lies between the channel members 47 and 48 on the flanges 51 and 52, FIGS. 1 and 3. The platform 50 is slidable on the flanges 51 and 52 to remove the platform 50 from below the floor 22 for use, and to insert the platform below the floor 22 for storage and travel. In one embodiment upstanding flanges 53 and 54 are fixed on the body 20 below the rear end 41 of the floor 22 and depending flanges 55 are fixed on the front end 56 of the platform 50.

Figure 4:
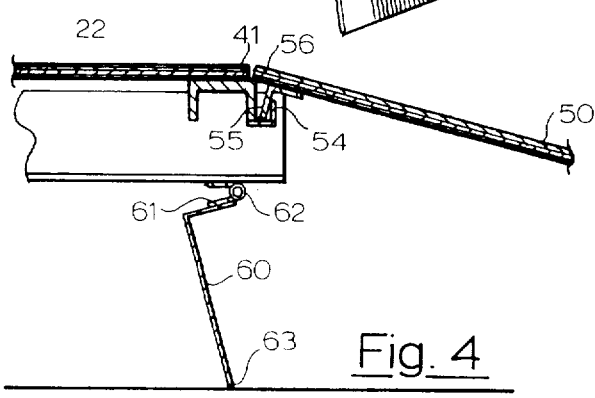
FIG. 4 is a broken away partial cross-sectional view at the rear end of the floor showing interlocking flange means for securing the platform as a ramp with the tail-gate swung down into ground contact as a support leg.
Figure 5:
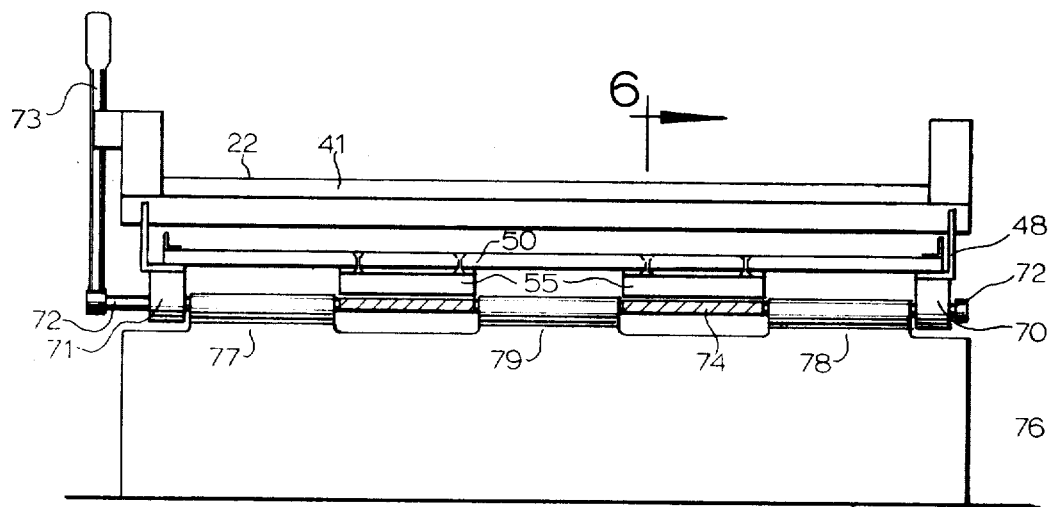
FIG. 5 is a rear elevational view of a trailer body as seen in the direction of the arrow 5 of FIG. 6, equipped with raising and lowering means showing said means in position to insert or remove the platform and showing the tail-gate in supporting condition.

To mount the platform 50 as a ramp leading from the ground to the rear end 41 of the floor 22, the user pulls the platform 50 out from below the floor 22 until the front end 56 of the platform 50 clears the rear end 41 of the floor 22. The user then raises the front end 56 of the platform 50 and interlocks the platform flanges 55 with the flanges 53 and 54 on the body 20 as seen in FIGS. 2 and 4, with the rear end 57 of the platform 50 resting on the ground or other supporting surface. This positions and supports the platform 50 as a ramp leading from the ground to the floor 22 to wheel loads on and off the trailer floor 22. When the user is through with the ramp-platform 50, he detaches the flanges 55 from the flanges 53 and 54, drops the front end 56 of the platform 50 on the slide flanges 51 and 52 and pushes the platform 50 forwardly on the slide flanges 51 and 52 to the storage and travel position, FIG. 1 and 3.

A tail gate 60 has an adjacent side 61 hinged to the body 20 by hinges 62 mounted on the channel members 47 and 48 and an opposite side 63. The tail-gate 60 swings between the up position, FIG. 1, and the down position, FIGS. 2, 3, and 4. In the up position the tail gate 60 closes over and secures the platform 50 below the floor 22. In the down position the opposite side 63 of the tail-gate 60 contacts the ground or other supporting surfaces at a jamming, non-skid angle. The tail-gate 60 in the down position in contact with the ground constitutes a support leg for the rear end of the trailer at the rear end 41 of the floor 22 and at the front end 36 of the ramp-platform 60, FIG. 2, 3, and 4, as this point is where support is needed most in wheeling loads on and off the trailer.

Referring now to a preferred embodiment of the invention for handling the front end 56 of the platform relative to the rear end 41 of the floor 22, FIGS. 5-8, bearing housings 70 and 71 are secured to the channel members 47 and 48 or another part of the body 20 as desired. Each housing 70 and 71 has an aperture aligned with the other. A pivot rod 72 lies transversely across the back of the body 20 in the apertures of the housings 70 and 71. A hand lever 73 is attached to the rod 72 to rotate the rod 72. Paired lift-lower arms 74 and 75, such as radial plates, are welded to the rod 72. A tail-gate 76 is freely hinged on the rod 72 at its outer ends 77 and 78 and at a central portion 79. The tail-gate 76 may be rolled at the adjacent edge to receive the rod 72 or have hinged strap loops around the rod, as desired. The tail-gate 76 has an opposite side 80 for contacting the ground in its down position to sue the tail-gate 76 as a support leg.

To remove the platform from the storage and travel position, the user first drops the tail-gate gate 76 into contact with the ground and this clears the platform 50. The user then swings the hand lever 73 to rotate the rod 72 to locate the radial arms 74 and 75 in their rearwardly extending horizontal position, FIGS. 5 and 6. The user then pulls the platform 50 rearwardly outwardly until the flanges 55 on the front end 56 of the platform 50 rest on the radial arms 74 and 75, such as against a stop 81 on the arms 74, 75, FIG. 2. A stop 80 on the trailer 20 abuts the hand lever 73 and/or a stop 81 abuts at least one of the arms 74 and 75 to hold the horizontal position of the arms 74 and 75 for inserting and removing the platform 50.

The user then swings the hand lever 73 to reversely pivot the rod 72 to swing the radial arms 74 and 75 thereon from the horizontal position just described to an upwardly vertical position. In their upwardly forwardly swing, the arms 74 and 75 lift the front end 56 of the platform 50 and/or drag it forwardly to a position adjacent the level of the rear end 41 of the trailer floor 22. In the design when the front end 56 of the platform so abuts the rear end 41 of the trailer floor 22, the arms 74 and 75 have moved to a position past vertical center on the rod 72 so that they incline slightly toward the rear end 41 of the trailer floor 22. Thus when a load is imposed on the platform 50, the arms 74 and 75 are locked against pivoting in the lowering direction of rotation. A safety stop 82 on the trailer 20 abuts the hand lever 73 to secure the arms 74 and 75 in their position adjacent vertical supporting the platform 50.

In the use position it will be noted that the tail-gate 76 in supporting the rod 72 also supports the bearing housings 70 and 71, the channel members 47 and 48, and the rear end 41 of the floor 22. Thus in loading and unloading the trailer, the heavy wheeled load, the weight of the driver and/or the person or persons hauling the load, are all supported by the tail-gate 76 as a support leg to resist tipping of the trailer on the wheels 21 and consequent dropping of the rear end 41 of the floor 22 and the front end 56 of the platform 50. In this way loads can be wheeled on and off the trailer when the trailer is not attached to a vehicle with ease, facility and safety, and when attached to a vehicle without strain on the trailer hitch in the up-uncoupling direction with complete safety against uncoupling and sudden drop.

Figures 6, 7:
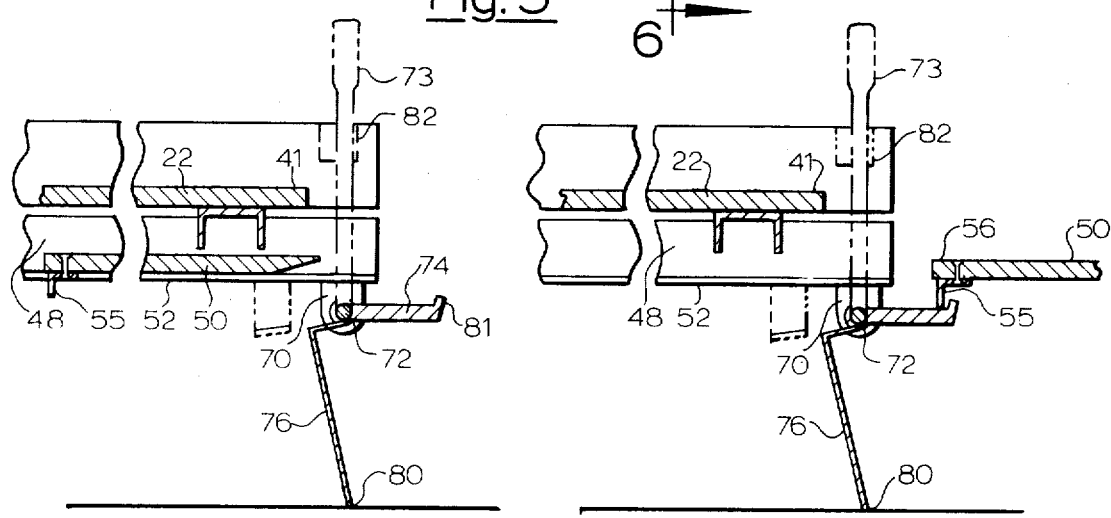
FIG. 6 is a cross-sectional view of the trailer body taken on the line 6—6 of FIG. 5, with the body broken away showing the hand lever and showing the ramp platform in the storage position below the floor.
FIG. 7 is a view similar to FIG. 6 showing the ramp platform removed from below the floor with its front flange resting on the raising and lowering arms.
Figure 8:
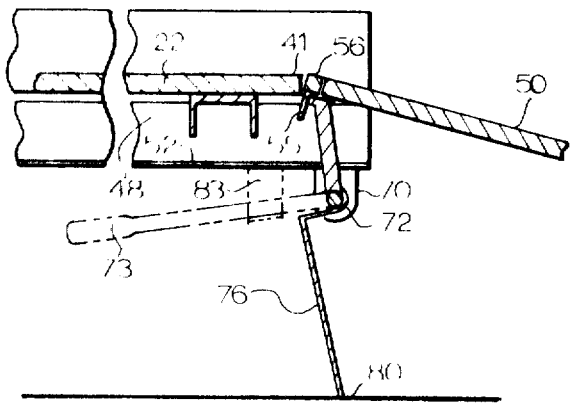
FIG. 8 is a view similar to FIG. 7 showing the hand lever and lifting arms swung 90° upwardly and forwardly from the position of FIG. 7, with the front end of the ramp platform moved upwardly and forwardly to the level of the floor.

After the load is wheeled on or off the trailer, FIGS. 5-8, the user moves the hand lever from the position of FIG. 8 to the position of FIG. 7. He then pushes the platform 50 off the arms 74 and 75 and onto the slide flanges 51 and 52 and to a position thereon under the floor 22. He then moves the hand lever 73 to the position of FIG. 8 to clear the arms 74 and 75 from projecting rearwardly and swings the tail-gate 76 to the up position behind the arms 74 and 75, the rear end 57 of the platform 50, and the rear end 41 of the floor 22.

The trailer with the easy - on and easy - off ramp for wheeled loads is especially suitable for heavy wheeled loads such as floor-washing machines, snow-mobiles, lawn-mowers, golf-carts, cycles, vehicles, and other loads as pallet-loads loaded and unloaded with power and manual dollies, lift-tracks et.

The scope of the invention is defined in the appended claims.

I claim:

1. A trailer particularly suitable for carrying floor-washing machines, snow-mobiles, cycles, and other wheeled-on loads comprising;

paired wheels, a floor, and means supporting said floor on said wheels; said floor having front and rear ends and opposite sides;

paired spaced channel members mounted below said floor adjacent said opposite sides of said floor and extending from a point adjacent said rear end of said floor toward said floor;

said channel members having flanges spaced below said floor and extending side-wise toward each other forming parallel slides below said floor, a platform lying on said flanges below said floor;

said platform being removable from below said floor and re-insertable below said floor by sliding said platform on said flanges;

said platform having front and rear ends and opposite sides;

connecting means at said rear end of said floor;

connecting means at said front end of said platform;

said connecting means at said floor and said platform being interconnectible to position said front end of said platform at said rear end of said floor;

said connecting means being pivotally interconnected to permit said rear end of said platform to swing into contact with the ground surface behind said trailer;

said platform when so connected constituting a ramp for wheeling loads from the ground surface onto said floor;

said platform being disconnectable and reinsertable below said floor as stated; and means for securing said platform below said floor during travel of said trailer;
hinge means on said trailer below said channel members adjacent said rear end of said floor;
a tail-gate having an adjacent edge secured on said hinge means;
said hinge means pivotally mounting said tail-gate to swing between an up position behind said floor and a down position below said floor;
said tail-gate having an outer edge spaced from said hinge means;
said hinge means being spaced above a supporting surface;
said tail-gate being of a dimension between its said adjacent edge and its said other edge about equal to said normal distance between said hinge means and the supporting surface;
said tail-gate in said down position contacting the supporting surface and constituting an auxiliary leg at said rear end of said floor to aid in supporting loads wheeled on and off said floor and said ramp to support said rear end of said floor and said front end of said ramp in loading and unloading.

2. A trailer particularly suitable for carrying floor-washing machines, snow-mobiles, cycles, and other wheeled-on loads comprising:
paired wheels, a floor, and means supporting said floor on said wheels; said floor having front and rear ends and opposite sides;
paired spaced channel members mounted below said floor adjacent said opposite sides of said floor and extending from a point adjacent said rear end of said floor toward said floor;
said channel members having flanges spaced below said floor and extending side-wise toward each other forming parallel slides below said floor;
a platform lying on said flanges below said floor;
said platform being removable from below said floor and reinsertable below said floor by sliding said platform on said flanges;
said platform having front and rear ends and opposite sides;
connecting means at said rear end of said floor;
connecting means at said front end of said platform;
said connecting means at said floor and said platform being interconnectible to position said front end of said platform at said rear end of said floor;
said connecting means being pivotally interconnected to permit said rear end of said platform to swing into contact with the ground surface behind said trailer;
said platform when so connected constituting a ramp for wheeling loads from the ground surface onto said floor;
said platform being disconnectible and reinsertable below said floor as stated; and
means for securing said platform below said floor during travel of said trailer;
said connecting means on said platform being downwardly depending flanges at its said front end;
a transverse cross rod below said slide channels adjacent said rear end of said floor,
means pivotally mounting said rod,
at least one lifting and lowering arm on said rod extending radially therefrom and swingable with said rod between a position above said rod and a horizontal position rearwardly of said rod;
a radially outer end on said arm,
a hand lever extending radially from said rod for pivoting said rod to swing said arm;
first stop means on said trailer engageable with one said arm and lever to locate and hold said arm at an angular horizontal position rearwardly of said rod behind and below said slide channels;
said platform upon removal from said slide channels moving at its said flanged front end onto said arm;
said hand lever providing means to pivot said rod to swing said arm to a position over said rod to raise said platform front end to the level of said floor and to engage said outer end of said arm with said flange to hold said platform; and
second stop means engageable with one said arm and lever to locate and hold said arm in a position over said rod supporting said front end of said platform;
said hand lever providing means to pivot said rod to swing said lever to its said first described horizontal position to disengage said flanged front end of said platform and lower it for insertion into said slide flanges.

3. A trailer particularly suitable for carrying floor-washing machines, snow-mobiles, cycles, and other wheeled-on loads comprising;
paired wheels, a floor, and means supporting said floor on said wheels; said floor having front and rear ends and opposite sides;
paired spaced channel members mounted below said floor adjacent said opposite sides of said floor and extending from a point adjacent said rear end of said floor toward said floor;
said channel members having flanges spaced below said floor and extending side-wise toward each other forming parallel slides below said floor,
a platform lying on said flanges below said floor;
said platform being removable from below said floor and re-insertable below said floor by sliding said platform on said flanges;
said platform having front and rear ends and opposite sides;
connecting means at said rear end of said floor;
connecting means at said front end of said platform;
said connecting means at said floor and said platform being interconnectible to position said front end of said platform at said rear end of said floor;
said connecting means being pivotally interconnected to permit said rear end of said platform to swing into contact with the ground surface behind said trailer;
said platform when so connected constituting a ramp for wheeling loads from the ground surface onto said floor;
said platform being disconnectable and reinsertable below said floor as stated; and
means for securing said platform below said floor during travel of said trailer;
said connecting means on said platform being a downwardly depending flange at its said front end;
a transverse cross rod below said slide channels adjacent said rear end of said floor,
means pivotally mounting said rod, at least one lifting and lowering arm on said rod extending radially therefrom and swingable with said rod between a position above said rod and a horizontal position rearwardly of said rod, a radially outer end on said arm, a hand lever extending radially from said rod for pivoting said rod to swing said arm, first stop means on said trailer engageable with one said arm and lever to locate and hold said arm at an angular horizontal position rearwardly of said rod behind and below said slide channels;

said platform upon removal from said slide channels moving at its said flanged front end onto said arm;

said hand lever providing means to pivot said rod to swing said arm to a position over said rod to raise said platform front end to the level of said floor and to engage said outer end of said arm with said flanges to hold said platform, second stop means engageable with one said arm and lever to locate and hold said arm in a position over said rod supporting said front end of said platform;

said hand lever providing means to pivot said rod to swing said lever to its said first described horizontal position to disengage said flanged front end of said platform and lower it for insertion into said slide flanges;

hinge means on said trailer below said channel members adjacent said rear end of said floor;

a tail-gate having an adjacent edge secured on said hinge means;

said hinge means pivotally mounting said tail-gate to swing between an up position behind said floor and a down position below said floor;

said tail-gate having an other edge spaced from said hinge means;

said hinge means being spaced above a supporting surface;

said tail-gate being a dimension between its said adjacent edge and its said other edge about equal to said normal distance between said hinge means and the supporting surface;

said tail-gate in said down position contacting the supporting surface and constituting an auxiliary leg at said rear end of said floor to aid in supporting loads wheeled on and off said floor and said ramp to support said rear end of said floor and said front end of said ramp in loading and unloading.

* * * * *